(12) United States Patent
Zohar et al.

(10) Patent No.: US 7,219,203 B2
(45) Date of Patent: May 15, 2007

(54) READING DATA FROM A MULTIPLICITY OF DISKS IN A DATA STORAGE SYSTEM

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: XIV Ltd., Tel Aviv (IL)

( * ) Notice: Subject to any disclaimer, the term of this patent is extended or adjusted under 35 U.S.C. 154(b) by 588 days.

(21) Appl. No.: 10/829,031

(22) Filed: Apr. 21, 2004

(65) Prior Publication Data

US 2005/0257082 A1 Nov. 17, 2005

(51) Int. Cl.
*G06F 13/00* (2006.01)

(52) U.S. Cl. .................. 711/162; 711/114; 709/224

(58) Field of Classification Search ............. 711/114, 711/162; 709/224
See application file for complete search history.

(56) References Cited

U.S. PATENT DOCUMENTS

| | | | |
|---|---|---|---|
| 6,112,257 A | 8/2000 | Mason, Jr. et al. | |
| 6,611,896 B1 | 8/2003 | Mason, Jr. et al. | |
| 7,028,156 B1 * | 4/2006 | Kiselev et al. | 711/162 |
| 2001/0025313 A1 * | 9/2001 | Feng et al. | 709/226 |

* cited by examiner

*Primary Examiner*—Brian R. Peugh
*Assistant Examiner*—Jared Rutz
(74) *Attorney, Agent, or Firm*—Katten Muchin Rosenman LLP (57) ABSTRACT

A method for reading data from a data storage system, consisting of storing a plurality of copies of the data at a respective plurality of data storage units and receiving at a data port an access request submitted by a host to receive the data. The method further includes transmitting from the port, in response to the access request, a plurality of delivery requests for the data to the respective plurality of data storage units, transmitting from the plurality of data storage units to the port respective responses to the delivery requests, the responses including the data, and accepting at the port an earliest-arriving response consisting of the response to the delivery requests arriving first at the port. The data in the earliest-arriving response is forwarded from the port to the host.

30 Claims, 8 Drawing Sheets

READING DATA FROM A MULTIPLICITY OF DISKS IN A DATA STORAGE SYSTEM

FIELD OF THE INVENTION

The present invention relates generally to data storage, and specifically to reading data that has been stored redundantly.

BACKGROUND OF THE INVENTION

A mass data storage system typically provides redundant data storage in a mirrored form to guard against the possibility of loss of data due to a failure in the system. The existence of multiple copies of the data not only protects against loss of the data, but affords an opportunity to use the multiple copies to improve the performance of the system, compared to systems having only one copy. The possibility for improvement is based on the fact that providing multiple copies may, of itself, enable the system to choose which of a particular copy is to be accessed.

Methods are known in the art for implementing such choice. U.S. Pat. No. 6,112,257 to Mason, Jr. et al., which is incorporated herein by reference, describes a method for dynamically adjusting a policy for accessing a mass storage system having mirrored volumes. Statistics of reading and writing data to/from the volumes are collected over a period of time. Depending on the statistics, the policy is maintained or is changed. The policy determines which of the mirrored logical volumes is accessed to service a read or write request.

U.S. Pat. No. 6,611,896 to Mason, Jr. et al., which is incorporated herein by reference, describes a method for adjusting a seek policy for mirrored and non-mirrored physical devices in a storage system. Statistics for accessing mirrored logical volumes on the physical devices are collected. The statistics are used to determine and minimize activity levels for non-mirrored physical devices.

The Storage Performance Council, of Redwood City, Calif., maintain a web site at http://www.storageperformance.org. The council provide benchmarks for characterizing storage systems, including a least response time (LRT™) measurement that characterizes the time for a storage system, operating at a low throughput rate, to respond.

SUMMARY OF THE INVENTION

The prior art provides improved performance for mirrored systems compared with non-mirrored ones, in terms of reduction of access activity, but does not address other areas of system operation. Improved performance in such other areas is desirable.

In embodiments of the present invention, a data storage system comprises a set of mirrored storage units at which multiple copies of data are stored. To read data from the system, a host conveys a data access request to a data port of the storage system. In response, the data port transmits delivery requests to the mirrored units at which the data is stored. Each unit receiving a delivery request sends a response comprising the data back to the data port. The port accepts the first response arriving at the port, this response herein being termed the earliest-arriving response, and forwards the data comprised in the earliest-arriving response to the host.

The mirrored storage units are typically slow-access-time mass storage units which are coupled to the data port, while the data port typically comprises a fast-access-time memory acting as a cache, to which the host data request is initially directed. If the cache is unable to provide the host with the requested data directly, the cache transmits delivery requests for the data to all the mass storage units at which the copies of the data have been stored. Typically, the delivery requests are transmitted as a single broadcast request, or as separate requests within a relatively short time period. The cache accepts the earliest-arriving response from the storage units and ignores any remaining responses. The process thus ensures that data is read from the storage system, and transferred to the host, in the fastest possible manner.

In some embodiments of the present invention, a capability of each of the storage units to fulfill data requests is measured. Depending on the measured capabilities, the data delivery requests may be transmitted to a sub-set of the storage units at which the data is stored, the sub-set comprising storage units which are expected to provide the fastest responses. The capability of each storage unit is typically measured in terms of an activity level of the storage unit, and/or a length of a queue of existing data requests to the unit. By being able to transmit data delivery requests to a selected sub-set of units having the data, the inherent speed of the process is maintained, while superfluous requests for data are reduced.

There is therefore provided, according to an embodiment of the present invention, a method for reading data from a data storage system, including:

storing a plurality of copies of the data at a respective plurality of data storage units;

receiving at a data port an access request submitted by a host to receive the data;

transmitting from the port, in response to the access request, a plurality of delivery requests for the data to the respective plurality of data storage units;

transmitting from the plurality of data storage units to the port respective responses to the delivery requests, the responses comprising the data;

accepting at the port an earliest-arriving response comprising the response to the delivery requests arriving first at the port; and forwarding from the port to the host the data comprised in the earliest-arriving response.

The data port may include a cache adapted to store the data, and receiving the access request may include performing a check that the data is stored in the cache, and transmitting the data from the cache in response to the check.

The data port may include a memory having a fast access time, and the data storage units may include units having slow access times.

The plurality of storage units may include a sub-set of a multiplicity of storage units, and the method may include determining the storage units in the sub-set.

Transmitting the plurality of delivery requests may include determining a measure of a capability of at least some of the storage units to fulfill the delivery requests, and transmitting the delivery requests in response to the measure. Determining the measure may include measuring an activity of at least one of the storage units, and measuring the activity of at least one of the storage units may include checking that the activity is different from a threshold activity.

Determining the measure may include measuring a length of a data request queue of at least one of the storage units and measuring the length of the data request queue may include checking that the length is different from a threshold length.

Determining the measure may include measuring an activity and a length of a data request queue of at least one of the storage units. The measure may include a substantially instantaneous measurement and/or a measurement taken over an extended period of time of the order of minutes.

The data storage units may include memories having fast access times.

Transmitting the plurality of delivery requests may include transmitting the delivery requests as a single delivery request receivable by the plurality of data storage units.

Transmitting the plurality of delivery requests may include transmitting all the requests within a period of less than approximately ten milliseconds.

There is further provided, according to an embodiment of the present invention, a data storage system, including:

a plurality of data storage units wherein are stored a respective plurality of copies of data; and a data port which is adapted to:

receive an access request for the data from a host, transmit, in response to the access request, a plurality of delivery requests for the data to the respective plurality of data storage units, receive from the plurality of data storage units respective responses to the delivery requests, the responses including the data, accept an earliest-arriving response comprising the response to the delivery requests arriving first at the port, and forward to the host the data included in the earliest-arriving response.

The data port may include a cache adapted to store the data, and receiving the access request may include performing a check that the data is stored in the cache, and transmitting the data from the cache in response to the check.

The data port may include a memory having a fast access time, and the data storage units may include units having slow access times.

The plurality of storage units may include a sub-set of a multiplicity of storage units, and the data port may be adapted to determine the storage units in the sub-set.

Transmitting the plurality of delivery requests may include determining a measure of a capability of at least some of the storage units to fulfill the delivery requests, and transmitting the delivery requests in response to the measure.

Determining the measure may include measuring an activity of at least one of the storage units.

Measuring the activity of at least one of the storage units may include checking that the activity is different from a threshold activity.

Determining the measure may include measuring a length of a data request queue of at least one of the storage units and measuring the length of the data request queue may include checking that the length is different from a threshold length.

Determining the measure may include measuring an activity and a length of a data request queue of at least one of the storage units.

The measure may include a substantially instantaneous measurement and/or a measurement taken over an extended period of time of the order of minutes.

The data storage units may include memories having fast access times.

Transmitting the plurality of delivery requests may include transmitting the delivery requests as a single delivery request receivable by the plurality of data storage units.

Transmitting the plurality of delivery requests may include transmitting all the requests within a period of less than approximately ten milliseconds.

The present invention will be more fully understood from the following detailed description of the embodiments thereof, taken together with the drawings, a brief description of which is given below.

DETAILED DESCRIPTION OF EMBODIMENTS

Figure 1:
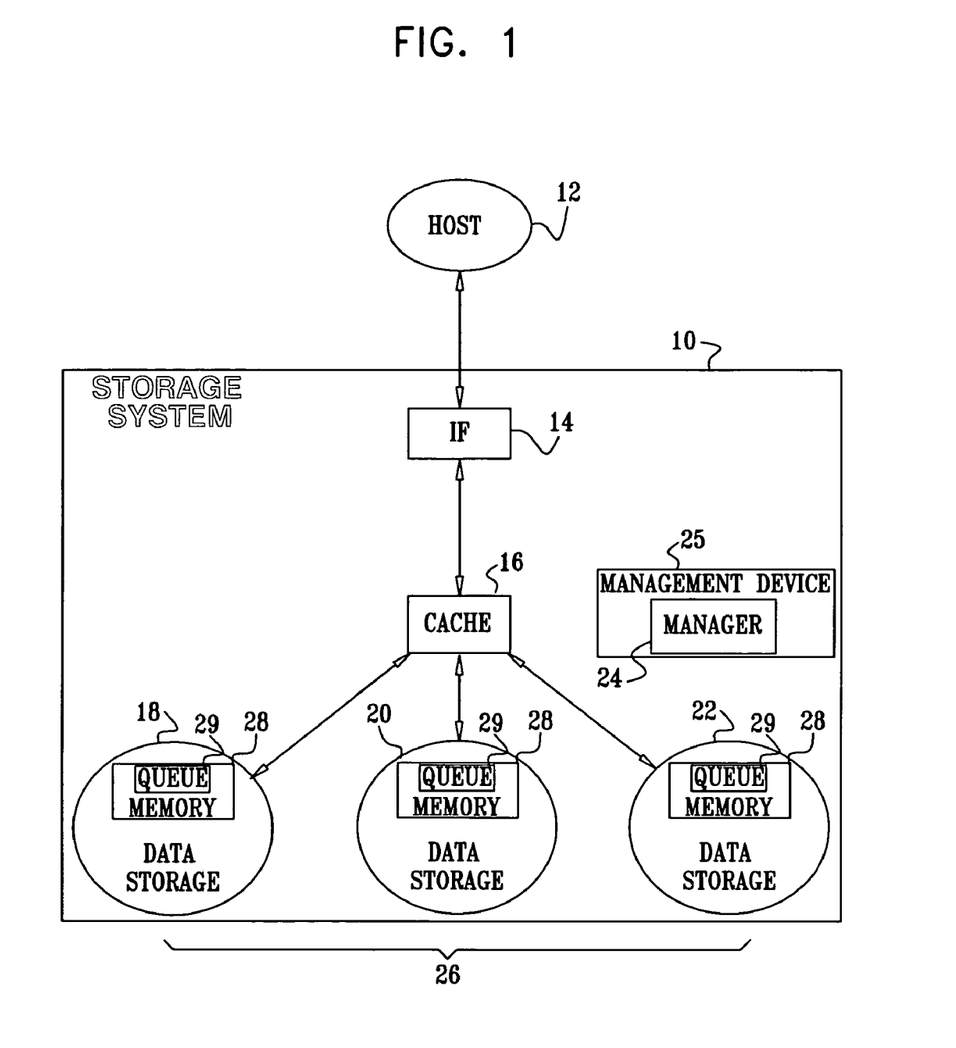
FIG. 1 is a schematic block diagram of a data storage system, according to an embodiment of the present invention.

Reference is now made to FIG. 1, which is a schematic block diagram of a data storage system 10, according to an embodiment of the present invention. Storage system 10 comprises a plurality of generally similar mass data storage units, herein by way of example assumed to comprise data storage units 18, 20, and 22. Data storage units 18, 20, and 22 are also referred to generally as storage units 26. Typically, at least some of units 26 comprise disks for mass storage of data, the disks having slow access times for reading data from or writing data to the disks. Alternatively or additionally, at least some of units 26 comprise solid state disks or other types of data storage media such as flash memory. Each unit 26 comprises a generally similar memory 28 wherein is configured a queue 29, the queues being used for temporary storage of data requests to the respective units until the unit is able to service the request.

System 10 also comprises an interface 14 which receives access requests for data from a host 12, and which processes the requests before transferring the requests to a cache 16. Interface 14 also receives data from cache 16, and processes and transfers the data to host 12. Cache 16 is intermediate between interface 14 and units 26, the cache typically comprising a fast-access-time memory such as a random access memory and/or a solid state disk. Cache 16 is able to transfer data, including requests for data, between itself and the interface, and also between itself and units 26, thus acting as a two way data port for system 10. System 10 typically also comprises a manager 24 which operates the system.

Each of the elements of system 10 may be implemented in a distributed or non-distributed manner. For example, manager 24 may comprise one or more processing units, and if the manager is formed from more than one processing unit, the processing units may be incorporated in cache 16, interface 14 and/or units 26, and/or in some other suitable element such as in a dedicated management device 25. Similarly, cache 16, interface 14, or one or more of units 26 may each comprise more than one sub-element coupled together to act as their respective elements. Furthermore, at least some of the elements or sub-elements of system 10 may be coupled directly or by a network such as the Internet, the coupling comprising physical and/or wireless links.

Storage system 10 is implemented to store data redundantly, so that at least two copies of every piece of data are stored permanently. By way of example, in system 10 units 18, 20, and 22 are assumed to mirror each other, so that three copies of each piece of data are stored in units 26.

System 10 is typically installed as part of a network attached storage (NAS) system, or as part of a storage attached network (SAN) system, data and/or file transfer between the elements of system 10 being implemented according to the protocol required by the type of system. For example, if system 10 is operative in a NAS system, data transfer is typically file based, using an Ethernet protocol; if system 10 is operative in a SAN system, data transfer is typically small computer system interface (SCSI) block based, using a fiber channel protocol. It will be appreciated, however, that embodiments of the present invention are not limited to any specific type of storage system, or specific type of data transfer method or protocol. Thus, embodiments of the present invention comprise substantially any suitable system wherein data is stored redundantly in a permanent or in a non-permanent manner, and wherein any suitable method for transferring data to and from, and between, elements of such a system is implemented.

Figure 2:
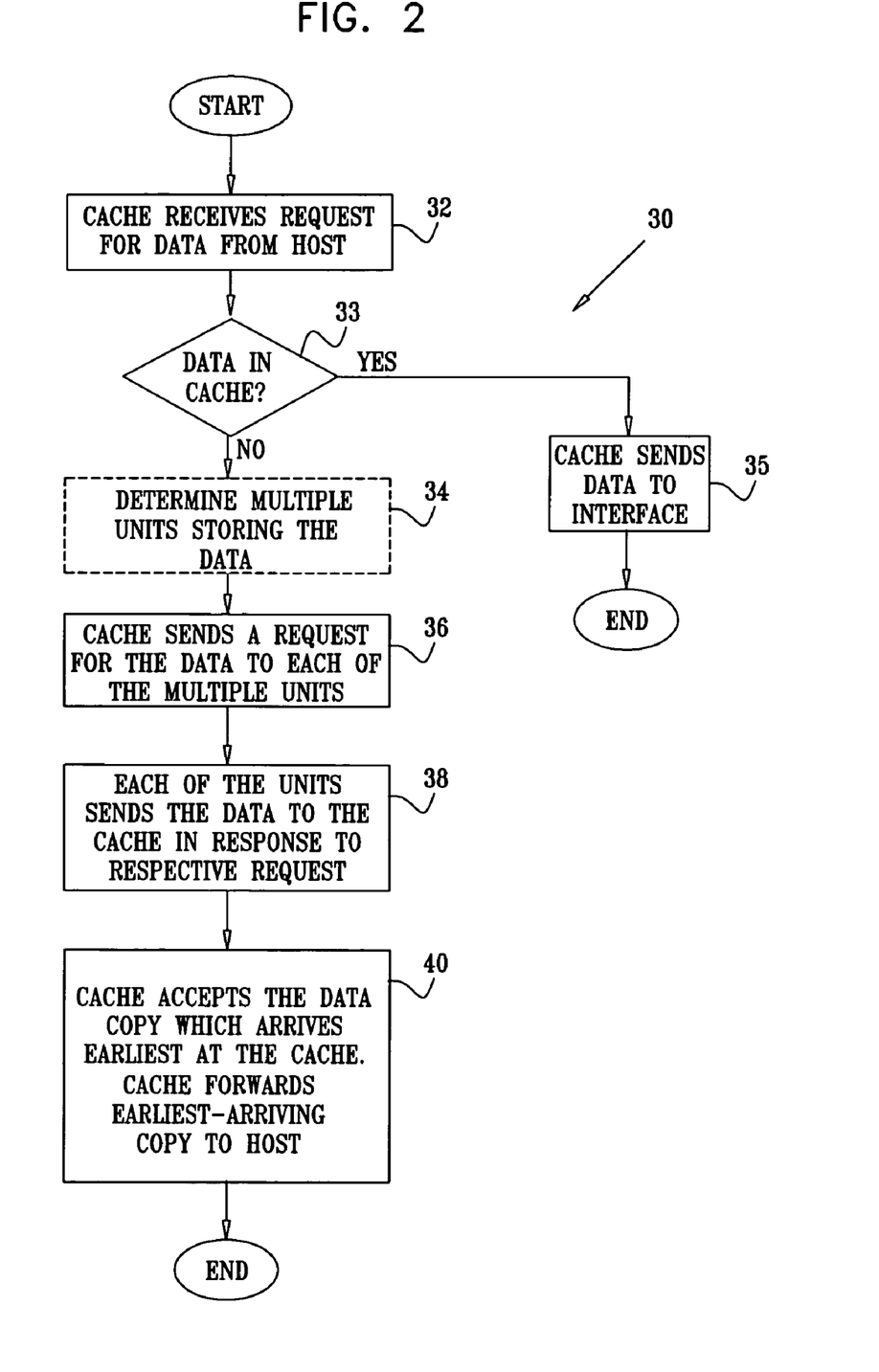
FIG. 2 is a flowchart showing steps followed when a host requests data from the system of FIG. 1, according to an embodiment of the present invention.

FIG. 2 is a flowchart 30 showing steps followed when host 12 requests a specific piece of data from system 10, according to an embodiment of the present invention. In a first step 32, interface 14 receives an access request for the data from host 12, and the interface conveys the request to cache 16. In a decision step 33, the cache checks if the data already exists in the cache, in which case in a step 35 the cache sends the data to interface 14, for transmittal to host 12, and the flowchart ends.

If the data is not in the cache, in some embodiments of the present invention, a data location step 34 is performed, to determine in which data storage units 26 the requested data has been stored. Data location step 34 is typically performed by manager 24, although it will be appreciated that other elements of system 10 such as cache 16, separately or in combination with each other and/or with the manager, may locate the data.

In an alternative embodiment of the present invention, data location step 34 is not performed, and the flowchart progresses directly from step 33 to a step 36 described below. In FIG. 2, the box for step 34 has a broken line to indicate that in some embodiments of the present invention the step may not be performed.

In step 36, if step 34 has been implemented, cache 16 transmits a delivery request for the data to each of the units where a copy of the data is stored, as determined in step 34, i.e., to units 18, 20 and 22. If step 34 has not been implemented, then cache 16 transmits delivery requests to all units 26, or to a pre-determined sub-set of the units, regardless of whether all the units to which the requests are directed have the data stored. For example, cache 16 may be configured to transmit the delivery request to two of units 26, the two being chosen at random; or, if system 10 comprises four data storage units, three of the units having the data stored, delivery requests may be sent to a randomly selected set of three of the four units, so that at least two delivery requests will be directed to respective units storing the data. Other methods for configuring cache 16 to transmit multiple requests for the data, to units wherein the data may be stored, will be apparent to those skilled in the art. All such methods are assumed to be comprised within the scope of the present invention.

In an embodiment of the present invention, cache 16 transmits the delivery requests to the different multiple units by generating a single request, which is broadcast to all storage units comprised in system 10, or which is multicast to a sub-set of the storage units. Such broadcast and multicast requests are well known in the art, and may be implemented, for example, by configuring the single request to be receivable by multiple units, and placing the single request on a bus coupling cache 16 to the storage units.

In an alternative embodiment of the present invention, cache 16 generates separate delivery requests which are transmitted to units 26, the separate delivery requests most preferably being transmitted from the cache within a relatively short time period of the order of ten milliseconds or less.

In the remaining description of flowchart 30, it is assumed that copies of the data are in storage units 18, 20, and 22, and that one or more requests for the data have been transmitted to the units, as described above in reference to step 36.

In a step 38, units 18, 20 and 22 receive the requests and reply by sending respective responses, comprising the data requested, to cache 16.

In a final step 40, cache 16 accepts the response from units 26 which arrives first at the cache, herein termed the earliest-arriving response. The cache forwards the data comprised in the earliest-arriving response via interface 14, to host 12.

It will be understood that regardless of the method cache 16 uses to transmit the data requests to the units which store the data, the units may receive their requests at different times, may require different times to respond, and the times taken for the responses to reach the cache may differ. The differences may be caused by a number of factors well known in the art, such as different transmission times between the cache and the storage units, different lengths of queued requests at the units, and different rates of access to the data by the units. By configuring cache 16 to transmit multiple data requests and accept the earliest-arriving data copy in response to the requests, the process exemplified by flowchart 30 automatically ensures that host 12 receives its requested data as early as system 10 is able to provide it, regardless of the differing times for receipt of the data from the multiple units wherein the data is stored.

Figure 3:
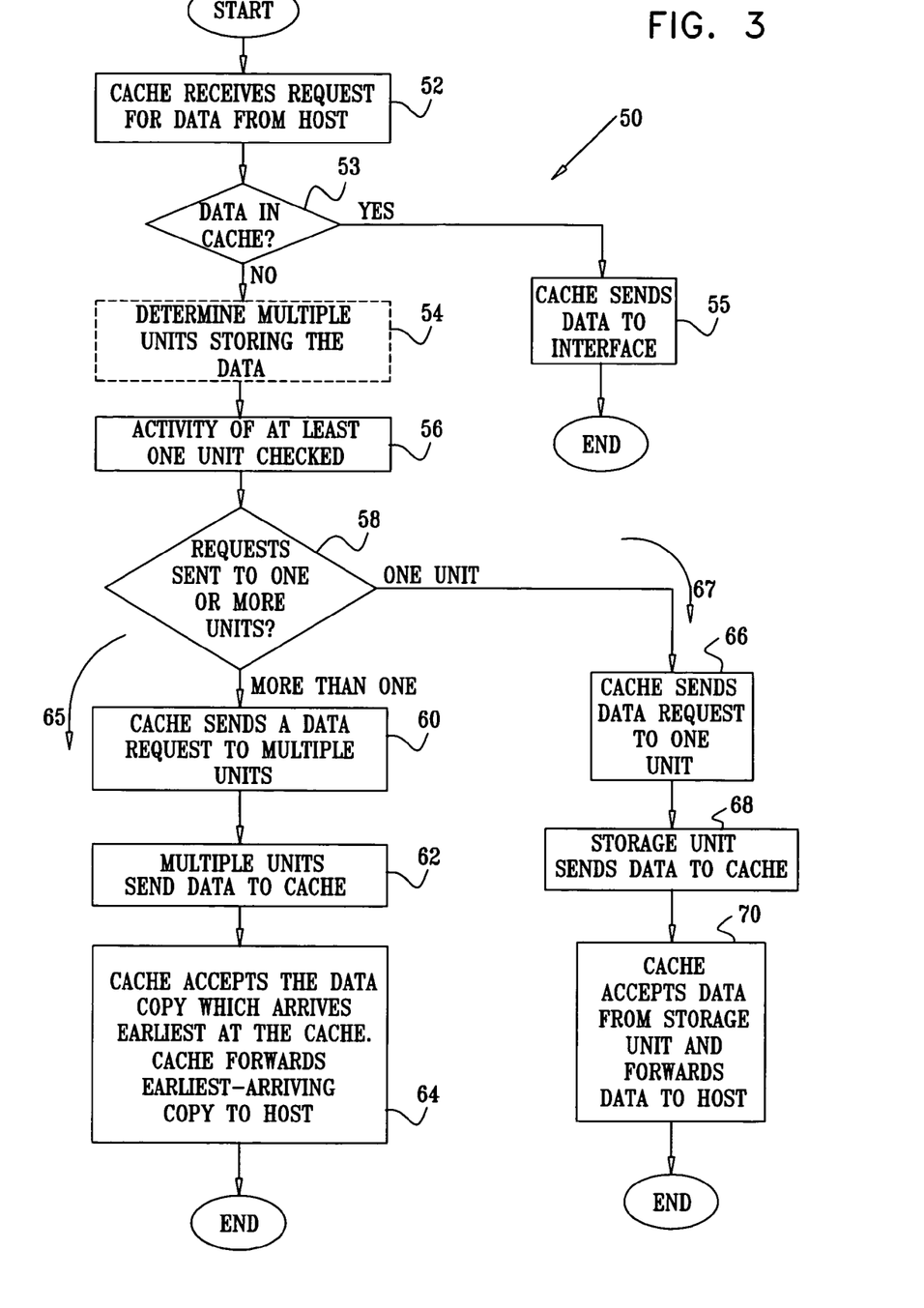
FIG. 3 is a flowchart showing steps followed when a host requests data from the system of FIG. 1, according to an alternative embodiment of the present invention.

FIG. 3 is a flowchart 50 showing steps followed when host 12 requests a specific piece of data from system 10, according to an alternative embodiment of the present invention. As is described in more detail below, in flowchart 50 an activity of at least one of the units storing the data is measured, the activity enabling a determination to be made of a capability of the units to fulfill data requests.

Steps 52, 53, and 55 are substantially the same, respectively, as steps 32, 33, and 35 of flowchart 30. A step 54, substantially the same as step 34 described above with reference to flowchart 30, may be implemented in some embodiments of the present invention.

In the following description of flowchart 50, it is assumed that copies of the data are in storage units 18, 20, and 22.

In an activity determination step 56, activities are measured of at least one of the units wherein the data is stored, the measurement typically being performed by manager 24, although it will be appreciated that other elements of system 10, such as the units themselves, may measure the activities. Parameters indicating disk activity are well known in the art. For example, one such activity parameter comprises the fraction of time a disk is active in a pre-set time period; other disk activity parameters may be based on measured transfer rates of data to and/or from the disk and/or a number of operations performed by the disk. Typically, values for the parameters may be determined by sampling and/or substantially continuous measurements on the units.

Based on the one or more activities measured in step 56, in a step 58 cache 16 decides whether to transmit a delivery request for the data to one storage unit 26, following a path 67 of the flowchart, or to more than one storage unit, following a path 65. The delivery request or requests are typically transmitted by one or more of the methods described above with reference to flowchart 30.

If, in step 58, cache 16 decides to send the data delivery request to more than one storage unit, then in a step 60 the cache transmits the data delivery request to at least two, and typically to all, of the storage units having the data.

In a step 62, the storage units to which requests have been sent receive their respective requests, and transmit respective responses comprising the data to the cache.

In a step 64, cache 16 accepts the response which arrives earliest at the cache, and forwards the data in the response to host 12.

If, in step 58, cache 16 decides to send the data delivery request to only one of the storage units, in a step 66 the cache transmits the request to the storage unit decided on. In steps 68 and 70, the storage unit receives the request and transmits the data to the cache. The cache forwards the received data to host 12. After steps 64 or 70, flowchart 50 finishes.

It will be appreciated that a number of different embodiments of the present invention may use the principles of flowchart 50. For example, a first of units 26 may have been designated as a primary unit, and a second of units 26 may have been designated as a secondary unit. Data is stored in the primary and the secondary unit, and the primary unit is the unit to which cache 16 transmits a request for data by default. In step 56, the activity of the secondary unit is measured. In decision 58, if the activity of the secondary unit is below a pre-set level, cache 16 transmits requests to both the primary and the secondary units, following path 65 of the flowchart. If the activity of the secondary unit is greater than or equal to the pre-set level, cache 16 sends the request only to the primary unit, following path 67.

Figure 4:
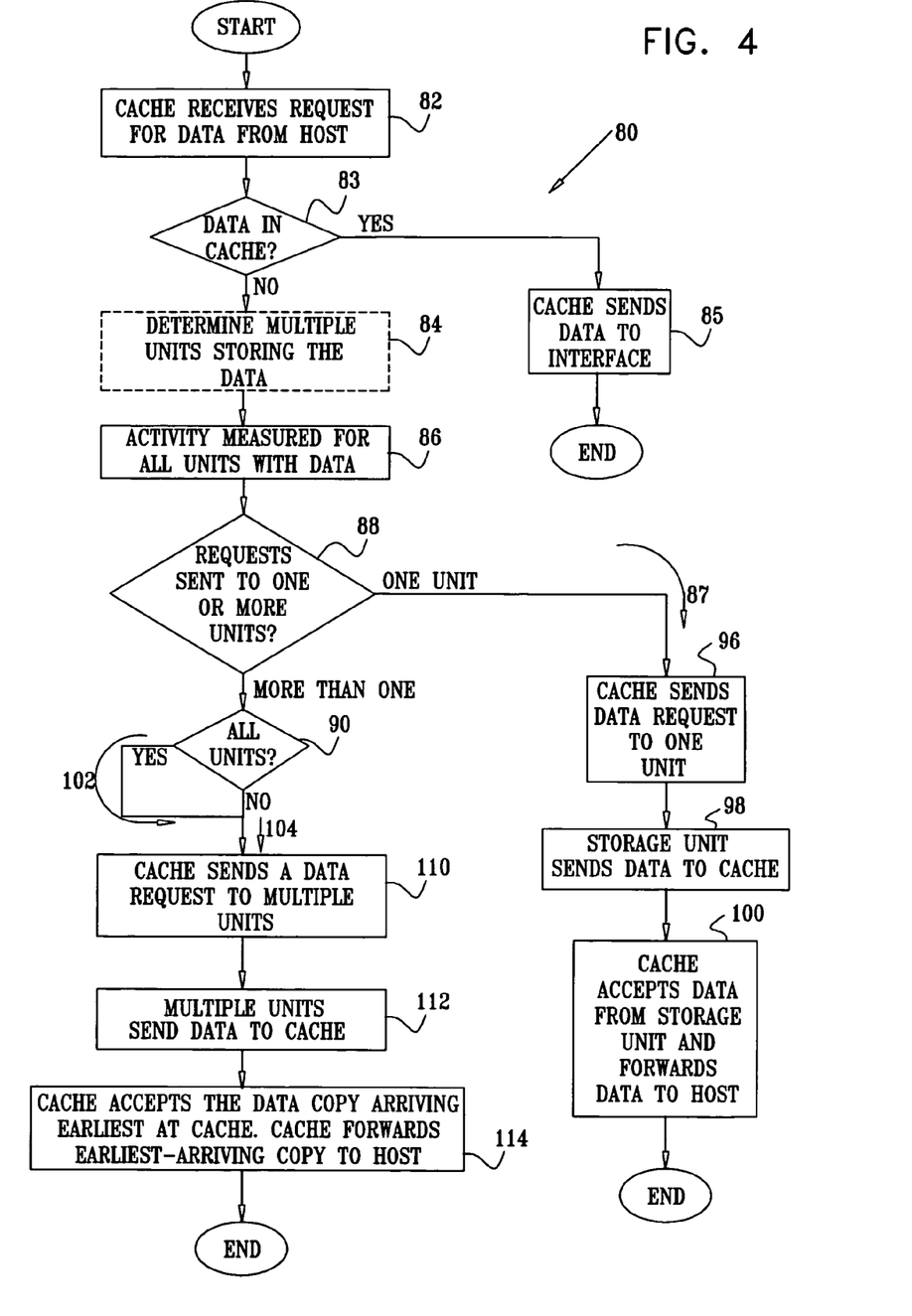
FIG. 4 is a flowchart showing steps followed when a host requests data from the system of FIG. 1, according to a further alternative embodiment of the present invention.

FIG. 4 is a flowchart 80 showing steps followed when host 12 requests a specific piece of data from system 10, according to a further alternative embodiment of the present invention. As is described in more detail below, in flowchart 80 activity of all of the units storing the data is measured.

Steps 82, 83, and 85 are substantially the same, respectively, as steps 32, 33, and 35 of flowchart 30. A step 84, substantially similar to step 34 described above with reference to flowchart 30, may be implemented in some embodiments of the present invention.

In the following description of the flowchart it is assumed that copies of the data are in storage units 18, 20, and 22.

In an activity determination step 86, activities are measured of all of the units wherein the data is stored, typically by one of the methods described above with reference to step 56 (FIG. 3).

In a first decision step 88, a determination is made if the delivery request for the data is to be transmitted to one of storage units 26, or to more than one unit. Typically, the decision is made by manager 24, and is made according to the levels of activities determined in step 86. For example, if all of the activities measured are above a first threshold, the request is transmitted to one of the units, most preferably the unit having the lowest activity, or alternatively a unit which has been set as a default unit. If the decision in step 88 is that the request is transmitted to one unit, a path 87 of the flowchart is followed. Path 87 comprises steps 96, 98, and 100, which are respectively substantially the same as steps 66, 68, and 70 of flowchart 50.

If step 88 returns a decision that the data delivery request is to be transmitted to more than one unit, then a second decision step 90 is invoked. In step 90 a decision is made if the data request is to be transmitted to all units storing the data, or to a sub-set of these units. Typically, the decision is according to the levels of activities determined in step 86. For example, if all of the activities measured are below a second threshold, the request is transmitted to all of the units, along a path 102 of the flowchart. If at least one of the activities is between the first and the second threshold, the request is transmitted to at least two units 26 having the data, most preferably including the unit or units having activities between the two thresholds, following a path 104.

Paths 102 and 104 both comprise steps 110, 112, and 114, which are respectively substantially the same as steps 60, 62, and 64 of flowchart 50.

Those skilled in the art will be able to formulate other embodiments based on the principles exemplified in flowcharts 50 and 80, wherein activities of storage units are measured, and wherein, depending on the results of such measurements, multiple requests for data may be transmitted to two or more storage units having the data. All such embodiments are assumed to be comprised within the scope of the present invention.

Figure 5:
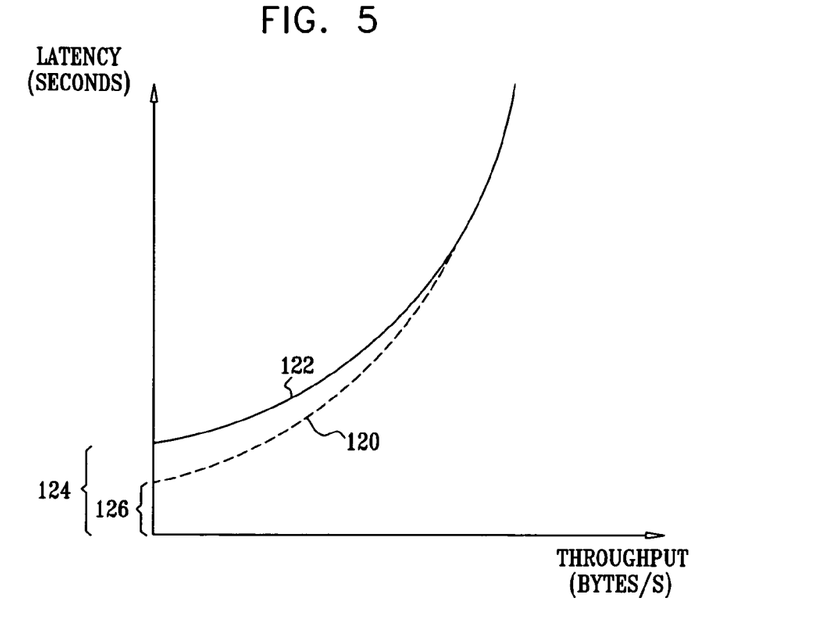
FIG. 5 shows schematic latency vs. data throughput graphs illustrating expected performance when the flowcharts of FIG. 3 or FIG. 4 are implemented, according to an embodiment of the present invention.

FIG. 5 shows schematic graphs illustrating the expected performance of system 10 compared with performance of a data storage system known in the art, according to an embodiment of the present invention. The graphs show latency, measured in seconds, vs. data throughput measured in bytes/second. Typically, latency in responding to a data request, in a storage system such as system 10, is a product of a number of different factors, well known in the art. These factors include hardware aspects of the system such as disk seek time, processing unit speeds, internal bandwidth, interconnect-speed and switch-speed. Latency may also be affected by the architecture and configuration of the system, as well as by algorithms, such as cache and/or disk management algorithms, implemented in the system.

A graph 122 is typical of a storage system known in the art, having a latency 124 for very low throughputs. The latency for very low throughputs corresponds to a least response time (LRT), referred to in the Background of the Invention. A graph 120, shows the relation between latency and throughput for the embodiments of system 10 described above with reference to flowcharts 30, 50, and 80, wherein the activity of at least some of storage units 26 is measured, and wherein multiple data requests depending on the measured activities may be transmitted. Graph 120 illustrates that at low throughputs, corresponding to low storage unit activity, there is a significant reduction in latency, so that LRT reduces to a latency 126, since at these low throughputs the flowcharts indicate that multiple requests are transmitted. Graph 120 also illustrates that there is no adverse affect on latency at high throughputs, corresponding to high storage unit activity, since at these high throughputs the flowcharts indicate that a single data request is transmitted, substantially as in prior art systems.

Figure 6:
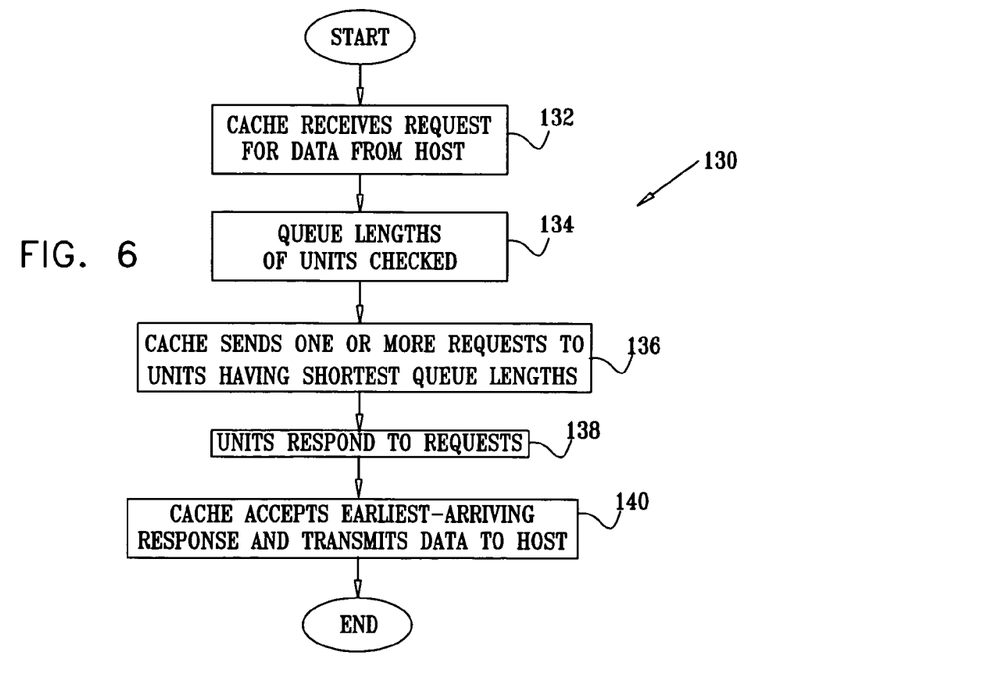
FIG. 6 is a flowchart showing steps followed when a host requests data from the system of FIG. 1, according to an alternative embodiment of the present invention.

FIG. 6 is a flowchart 130, showing steps performed in response to a data access request, according to a further alternative embodiment of the present invention. Flowchart 130 illustrates use of queues 29 (FIG. 1).

In a first step 132, cache 16 receives an access request for data from host 12.

In a second step 134, lengths of each queue 29, of the units 26 where the data is stored, are measured, typically by manager 24. The lengths provide an alternative measure, to that of activity, of the capability of units to fulfill data requests.

Depending on the lengths determined in step 134, in a step 136 cache 16 transmits one or more requests for the data to units 26. Typically, if one request is transmitted, the request is transmitted to the unit having the queue with the shortest length, or to the unit closest to a threshold queue length. If multiple requests are transmitted, the requests are typically transmitted substantially simultaneously. Depending on how system 10 has been configured, the multiple requests may be transmitted to some or all of the units storing the data. For example, if all of units 26 have the data stored, requests may be transmitted to the two units having the shortest queues.

In a step 138, each of the units to which a data request has been transmitted responds.

In a final step 140, cache 16 accepts the earliest-arriving response from the units, and conveys the data received from the response to host 12.

Figure 7:
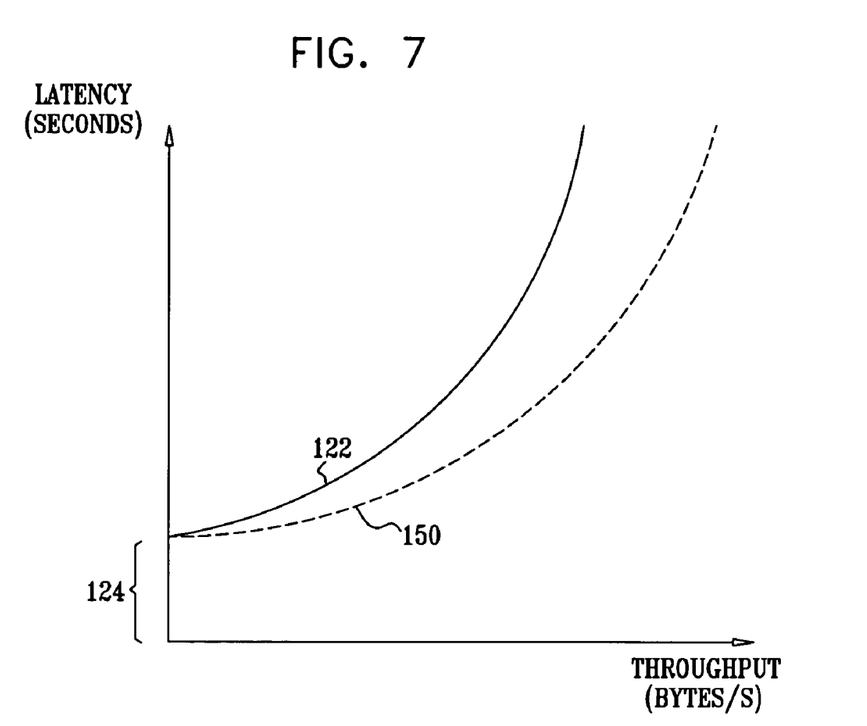
FIG. 7 shows schematic latency vs. data throughput graphs illustrating expected performance when the flowchart of FIG. 6 is implemented, according to an embodiment of the present invention.

FIG. 7 shows schematic latency vs. data throughput graphs illustrating expected performance of system 10 when flowchart 130 is implemented, according to an embodiment of the present invention. A graph 150 shows the relation between latency and throughput for the embodiment of system 10 described above with reference to flowchart 130. Graph 150 illustrates that at high throughputs there is a significant reduction in latency, since using units with shorter queues at these high throughputs is advantageous. Graph 150 also illustrates that there is no adverse affect on latency at low throughputs and that latency is substantially as in prior art systems.

Flowchart 130 (FIG. 6) illustrates a procedure where the queues of storage units are measured, and graph 150 (FIG. 7) shows the improvement in latency at high throughputs when such a procedure is implemented. Flowcharts 50 and 80 (FIGS. 3 and 4) illustrate procedures where the activities of storage units are measured, and graph 120 (FIG. 5) shows the improvement in latency at low throughputs when the procedures are implemented. In some embodiments of the present invention system 10 is configured so that both queue length and activity of storage units are measured, so as to achieve an improvement in latency at both low and high throughputs.

Figure 8:
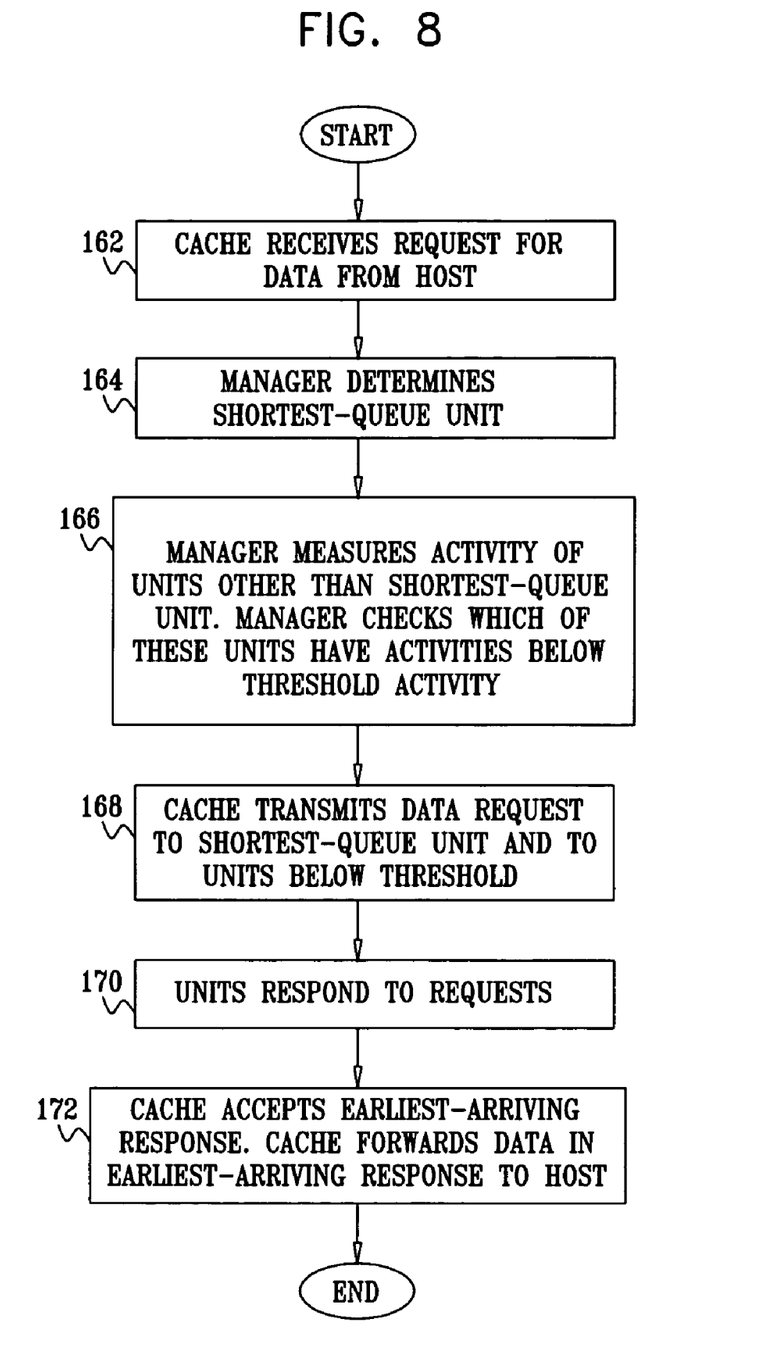
FIG. 8 is a flowchart showing steps followed in response to a data request when storage unit queue length and activity are measured, according to an embodiment of the present invention.

FIG. 8 is a flowchart 160, showing steps performed in response to a data request when storage unit queue length and activity are measured, according to an embodiment of the present invention.

By way of example, in the following description of flowchart 160, manager 24 is assumed to make measurements on elements of system 10. It will be understood, however, that measurements made and actions taken to implement the steps of the flowchart may be performed by any suitable element comprised in the system, such as by cache 16, by storage units themselves, and/or by manager 24 separately or in combination.

In an initial step 162, cache 16 receives a data request from host 12.

In a step 164, manager 24 determines which units 26 store the data, and measures lengths of queues of these units. From the measurements, manager 24 determines the unit 26 having the shortest queue, herein termed the "shortest-queue" (SQ) unit.

In a step 166, manager 24 measures the activities of units 26 other than the SQ unit, and checks which of these units have activities below a pre-set threshold.

In a step 168, cache 16 transmits a data request to the SQ unit and to any units determined, in step 166, to have activities below the pre-set threshold. The cache most preferably transmits the multiple requests by one of the methods described above with reference to step 36 (FIG. 2).

In a step 170, units to which the data requests have been transmitted respond to the requests by transmitting responses comprising the data requested to cache 16.

In a final step 172, cache 16 accepts the earliest-arriving response from the responding units of step 170, and forwards data included in the response to host 12.

It will be appreciated that flowchart 160 exemplifies one configuration of system 10 wherein both activities and queue lengths of storage units are measured, and wherein, based on the results of the measurements, multiple requests for data may be transmitted to different units storing the data. Similar configurations of data storage systems to that exemplified by flowchart 160 will be apparent to those skilled in the art. For example, in step 166, manager 24 may also measure the activity of the SQ unit, and in step 168 cache 16 may not transmit a data request to the SQ unit if the activity is above a pre-defined level.

All such configurations, wherein activities and queue lengths of storage units are measured, so that multiple requests for data may be transmitted to different units of the system, and wherein the earliest-arriving response to the multiple requests is accepted, are to be considered as included within the scope of the present invention.

Figure 9:
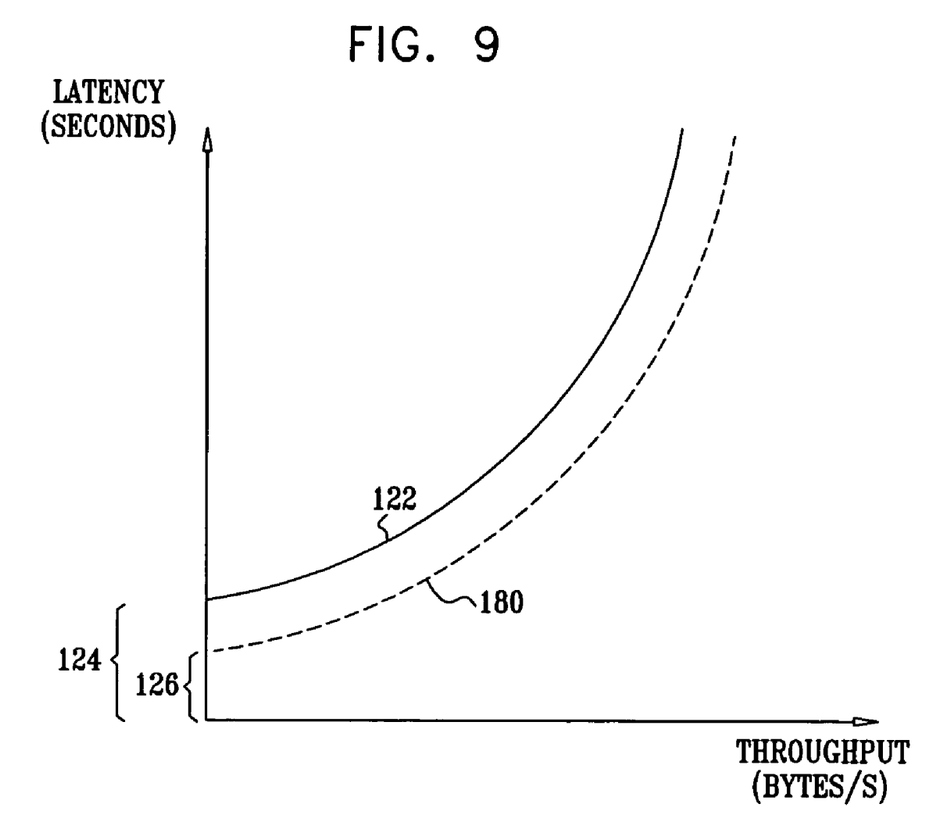
FIG. 9 shows schematic latency vs. data throughput graphs illustrating expected performance when the flowchart of FIG. 8 is implemented, according to an embodiment of the present invention.

FIG. 9 shows schematic latency vs. data throughput graphs illustrating the expected performance of system 10 when activities and queue lengths of storage units are measured, according to an embodiment of the present invention. A graph 180 shows the relation between latency and throughput for the embodiment of system 10 described above with reference to flowchart 160. Graph 180 illustrates that the reductions in latency, illustrated respectively for low and high throughputs by graphs 120 and 150, apply to all throughputs, as compared to latencies of a prior art storage system, exemplified by graph 122. The improvement in latencies over the whole range of throughputs is due to measuring both activities and queue lengths of storage units, and selectively determining to which storage units multiple requests are to be transmitted according to the measured values.

In the embodiments described above, both activity and queue length measurements may be made in response to a data request, and such measurements are typically substantially instantaneous measurements on specific storage units, the time period of measurement typically being of the order of microseconds. Alternatively or additionally, measurements of activities and/or queue lengths may be made by other methods, such as by compiling statistics of activities and/or queue lengths for one or more storage units over an extended period of time, and generating measures of activities and/or queue lengths for a specific storage unit, or for a group of storage units, from the statistics. The time period for the extended period is typically of the order of minutes. These and other methods for measuring activity and/or queue length are well known in the art.

Such measures, typically updated periodically, may be used in formulating decisions in system 10, rather than, or in addition to, the instantaneous measurements referred to above. All such measures, and decisions made on the basis of the measures, are assumed to be comprised within the scope of the present invention.

Embodiments of the present invention described above have assumed that cache 16 acts as a data port, transmitting multiple requests to storage units 26 in response to an initial request conveyed via interface 14, and receiving respective responses from the units. It will be appreciated that the principles of the present invention may be applied to other configurations of storage systems.

For example, cache 16 may comprise a distributed caching system wherein a plurality of copies of data are stored. An example of a distributed caching system is described in detail in U.S. patent application Ser. No. 10/620,249 which is assigned to the assignees of the present application, and which is incorporated herein by reference. In the case of a distributed caching system, interface 14 may be configured to act as the data port, transferring multiple data requests and responses to and from the distributed caching system. Furthermore, it will be appreciated that the principles of the present invention may be applied in more than one manner within a single storage system. For example, interface 14 may be configured as a first data port communicating with multiple caches of a distributed caching system, and the multiple caches may be configured as second data ports each communicating with respective sets of data storage units such as units 26.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for reading data from a data storage system, comprising:
    storing a plurality of copies of the data at a respective plurality of data storage units;
    receiving at a data port an access request submitted by a host to receive the data;
    transmitting from the port, in response to the access request, a plurality of delivery requests for the data to the respective plurality of data storage units;
    transmitting from the plurality of data storage units to the port respective responses to the delivery requests, the responses comprising the data;
    accepting at the port an earliest-arriving response comprising the response to the delivery requests arriving first at the port; and
    forwarding from the port to the host the data comprised in the earliest-arriving response.

2. The method according to claim 1, wherein the data port comprises a cache adapted to store the data, and wherein receiving the access request comprises performing a check that the data is stored in the cache, and transmitting the data from the cache in response to the check.

3. The method according to claim 1, wherein the data port comprises a memory having a fast access time, and wherein the data storage units comprise units having slow access times.

4. The method according to claim 1, wherein the plurality of storage units comprise a sub-set of a multiplicity of storage units, and comprising determining the storage units comprised in the sub-set.

5. The method according to claim 1, wherein transmitting the plurality of delivery requests comprises determining a measure of a capability of at least some of the storage units to fulfill the delivery requests, and transmitting the delivery requests in response to the measure.

6. The method according to claim 5, wherein determining the measure comprises measuring an activity of at least one of the storage units.

7. The method according to claim 6, wherein measuring the activity of at least one of the storage units comprises checking that the activity is different from a threshold activity.

8. The method according to claim 5, wherein determining the measure comprises measuring a length of a data request queue of at least one of the storage units.

9. The method according to claim 8, wherein measuring the length of the data request queue comprises checking that the length is different from a threshold length.

10. The method according to claim 5, wherein determining the measure comprises measuring an activity and a length of a data request queue of at least one of the storage units.

11. The method according to claim 5, wherein the measure comprises a substantially instantaneous measurement.

12. The method according to claim 5, wherein the measure comprises a measurement taken over an extended period of time of the order of minutes.

13. The method according to claim 1, wherein the data storage units comprise memories having fast access times.

14. The method according to claim 1, wherein transmitting the plurality of delivery requests comprises transmitting the delivery requests as a single delivery request receivable by the plurality of data storage units.

15. The method according to claim 1, wherein transmitting the plurality of delivery requests comprises transmitting all the requests within a period of less than approximately ten milliseconds.

16. A data storage system, comprising:
    a plurality of data storage units wherein are stored a respective plurality of copies of data; and
    a data port which is adapted to:
        receive an access request for the data from a host,
        transmit, in response to the access request, a plurality of delivery requests for the data to the respective plurality of data storage units,
        receive from the plurality of data storage units respective responses to the delivery requests, the responses comprising the data,
        accept an earliest-arriving response comprising the response to the delivery requests arriving first at the port, and
        forward to the host the data comprised in the earliest-arriving response.

17. The system according to claim 16, wherein the data port comprises a cache adapted to store the data, and wherein receiving the access request comprises performing a check that the data is stored in the cache, and transmitting the data from the cache in response to the check.

18. The system according to claim 16, wherein the data port comprises a memory having a fast access time, and wherein the data storage units comprise units having slow access times.

19. The system according to claim 16, wherein the plurality of storage units comprise a sub-set of a multiplicity of storage units, and wherein the data port is adapted to determine the storage units comprised in the sub-set.

20. The system according to claim 16, wherein transmitting the plurality of delivery requests comprises determining a measure of a capability of at least some of the storage units to fulfill the delivery requests, and transmitting the delivery requests in response to the measure.

21. The system according to claim 20, wherein determining the measure comprises measuring an activity of at least one of the storage units.

22. The system according to claim 21, wherein measuring the activity of at least one of the storage units comprises checking that the activity is different from a threshold activity.

23. The system according to claim 20, wherein determining the measure comprises measuring a length of a data request queue of at least one of the storage units.

24. The system according to claim 23, wherein measuring the length of the data request queue comprises checking that the length is different from a threshold length.

25. The system according to claim 20, wherein determining the measure comprises measuring an activity and a length of a data request queue of at least one of the storage units.

26. The system according to claim 20, wherein the measure comprises a substantially instantaneous measurement.

27. The system according to claim 20, wherein the measure comprises a measurement taken over an extended period of time of the order of minutes.

28. The system according to claim 16, wherein the data storage units comprise memories having fast access times.

29. The system according to claim 16, wherein transmitting the plurality of delivery requests comprises transmitting the delivery requests as a single delivery request receivable by the plurality of data storage units.

30. The system according to claim 16, wherein transmitting the plurality of delivery requests comprises transmitting all the requests within a period of less than approximately ten milliseconds.

* * * * *